April 9, 1946.  J. KOTT  2,398,231
STAR DRILL
Filed March 14, 1944
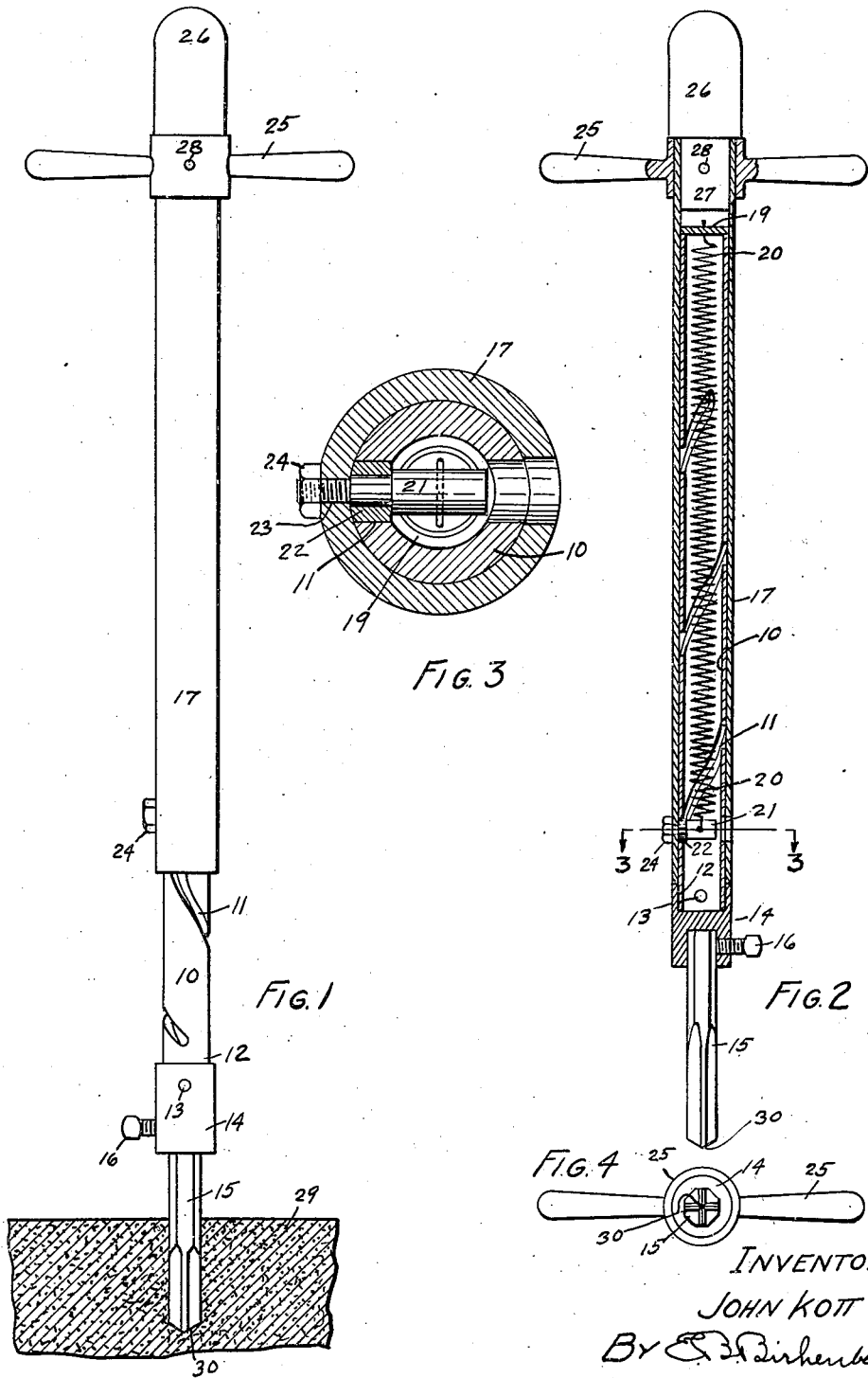
INVENTOR
JOHN KOTT
BY [signature]
ATTORNEY

UNITED STATES PATENT OFFICE 2,398,231

STAR DRILL

John Kott, Portland, Oreg.

Application March 14, 1944, Serial No. 526,466

1 Claim. (Cl. 255—43)

This invention relates generally to drilling machines and particularly to a star drill.

The main object of this invention is to provide a drill especially adapted for use in drilling holes in concrete, stone, and similar materials with a minimum expenditure of time and energy.

The second object is to produce a drill of the class described in which holes can be drilled in otherwise inaccessible places and without danger or injury to the person of the user.

A further object is to provide a drill of the class described which will never stick in the drilling operation and which will automatically turn out the material at the bottom of the hole as rapidly as the indentations are made therein.

I accomplish these and other objects in the manner set forth in the following specification as illustrated in the accompanying drawing, in which:

Fig. 1 is a side elevation of the device showing the drill entered into a slab of concrete which is shown in section.

Fig. 2 is a fragmentary longitudinal section through the device showing the operating handle in a depressed position.

Fig. 3 is a transverse section taken along line 3—3 in Fig. 2.

Fig. 4 is a bottom view of Fig. 2.

Referring in detail to the drawing, there is shown a tubular core 10 having a spiral slot 11 formed therein. The lower end 12 of the core 10 is secured by means of a pin 13 to a chuck 14, into the lower end of which can be inserted the usual star drill bit 15, which is held by means of a set screw 16 or in any other convenient manner.

The core 10 is slidably placed within the sleeve 17, whose lower end 18 strikes against the chuck 14 when the sleeve 17 is in a lowermost position. A disc 19 is placed across the upper end of the core 10 and has attached thereto a tension spring 20 whose lower end is attached to a bolt 21, on which is mounted a roller 22, which occupies the slot 11. The bolt 21 projects through a hole 23 in the sleeve 17, and is locked by means of the nut 24. On the upper end of the sleeve 17 is mounted a T handle 25. A rounded head 26 is placed on the top of the handle 25 and the shank 27 of the head 26 extends into the sleeve 17 and the pin 28 secures the members 25, 26 and 27 together.

The operation of this device is as follows:

When it is desired to drill a hole in concrete 29, it is only necessary to place the point 30 of the drill 15 in the correct position and then to grasp the handle 25 with both hands and cause the sleeve 17 to reciprocate vigorously by moving the handle 25 downwardly, causing it to strike against the chuck 14 with force, and thereby impart the blow to the drill point 28.

Obviously while the sleeve 17 is descending it cannot rotate, by reason of the fact that the handle 25 is held by both hands and therefore it causes the drill 15 to rotate as the sleeve 17 descends. After the blow is struck, the rebound coupled with the tension of the spring 20 causes the handle 25 to move to the position shown in Fig. 1, after which the movement is repeated.

It can be seen that as the star drill cuts downwardly, it also cuts in a rotary fashion, making it very effective in this operation.

While I have thus illustrated and described my invention, it is not my intention to limit it to the precise form shown herein, but I do intend to cover all such forms and modifications thereof as fall fairly within the appended claim.

I claim:

A drill of the class described, consisting of a chuck for holding a star drill bit, a spirally slotted tubular core constituting an extension for said chuck, a sleeve slidably mounted on said tube adapted to stop against said chuck, said sleeve having a roller attached thereto disposed within said spiral slot, a T handle on said sleeve whereby same may be reciprocated and whereby resistance may be offered against a turning movement, and a spring within said core adapted to urge said handle away from the point of said drill.

JOHN KOTT.